United States Patent [19]
Fischer et al.

[11] Patent Number: 6,161,190
[45] Date of Patent: Dec. 12, 2000

[54] CLOCK SIGNAL LOADING DEVICE AND METHOD

[75] Inventors: Werner Fischer, Heimsheim; Peter Grosshans, Hochdorf; Kai-Lars Barbehoen, München, all of Germany

[73] Assignee: Robert Bosch GmbH, Stuttgart, Germany

[21] Appl. No.: 09/084,829

[22] Filed: May 26, 1998

[30] Foreign Application Priority Data

May 27, 1997 [DE] Germany ............................ 197 22 114

[51] Int. Cl.[7] ........................................................ G06F 1/04
[52] U.S. Cl. ............................. 713/600; 713/400; 710/58
[58] Field of Search ...................................... 713/500, 501, 713/502, 503, 600, 601, 400, 401; 712/8.9; 395/500; 327/293; 364/280, 900; 340/825.06; 709/107, 225, 227; 710/25, 267, 58–61

[56] References Cited

U.S. PATENT DOCUMENTS

| | | | |
|---|---|---|---|
| 4,890,222 | 12/1989 | Kirk ........................................ | 364/200 |
| 4,893,271 | 1/1990 | Davis et al. ............................ | 364/900 |
| 5,230,012 | 7/1993 | Schenk . | |
| 5,272,650 | 12/1993 | Adams et al. ........................... | 364/571 |
| 5,313,618 | 5/1994 | Pawloski ................................ | 395/500 |
| 5,392,421 | 2/1995 | Lennartsson ........................... | 395/550 |
| 5,418,526 | 5/1995 | Crawford ............................ | 340/825.06 |
| 5,455,762 | 10/1995 | Braun ..................................... | 364/140 |
| 5,625,311 | 4/1997 | Nakatsu .................................. | 327/293 |
| 5,915,108 | 6/1999 | Frey et al. ............................. | 713/500 |

FOREIGN PATENT DOCUMENTS

| | | |
|---|---|---|
| 0 153 107 A2 | 8/1985 | European Pat. Off. . |
| 0 286 879 | 10/1988 | European Pat. Off. . |
| 0 356 548 A1 | 3/1990 | European Pat. Off. . |
| 0 412 328 A2 | 2/1991 | European Pat. Off. . |
| 0 727 893 A1 | 8/1996 | European Pat. Off. . |
| 0 813 321 A2 | 12/1997 | European Pat. Off. . |
| 44 31 415 | 2/1996 | Germany . |
| 95/21412 | 8/1995 | WIPO . |
| WO 97/25788 | 7/1997 | WIPO . |

OTHER PUBLICATIONS

IBM Technical Disclosure Bulletin, "Circuit for Detection of the Failure of One of Two Clocks", vol. 29, No. 12, May 1987.

*Primary Examiner*—Reba I. Elmore
*Assistant Examiner*—Rijue Mai
*Attorney, Agent, or Firm*—Kenyon & Kenyon

[57] ABSTRACT

A clock signal loading device for a processor of a controller connected to a network and a clock signal loading method are provided. The device includes a first oscillator for generating a clock signal that can be loaded to the processor, a controllable clock signal changer for changing the clock signal generated by the first oscillator, and a control device connected to the network for generating a control signal for controlling the clock signal changer as a function of the communication signals transmitted over the network. This device and method allows the frequency of the clock signal needed by the processor to be tuned in a simple and flexible manner.

32 Claims, 2 Drawing Sheets

CLOCK SIGNAL LOADING DEVICE AND METHOD

FILED OF THE INVENTION

The present invention relates to a clock signal loading device for a processor of a controller connected to a network and to a clock signal loading method.

BACKGROUND INFORMATION

Although it is applicable, in principle, to any network, the present invention and the objects of the present invention shall be described below with reference to motor vehicle controllers connected to one another via the CAN (Controller Area Network) system. Details about the CAN system are described in a publication by Etschberger, "Controller Area Network", Hansa Verlag, 1994.

The processors used in such controllers, for example, engine controllers, pump controllers, brake controllers, etc., are normally supplied with an external clock signal supplied by an oscillator in the form of an oscillating quartz crystal. The accuracy with which the clock frequency of the oscillator is set directly affects the computing accuracy of the respective processor.

If interference occurs in this external oscillator or if the external oscillator fails completely, the function of the respective controller can be impaired or fully disabled. If such a failure occurs in important vehicle controllers, such as the engine controller, this normally results in an extremely undesirable breakdown of the vehicle.

Since the probability of a failure of an oscillator during its expected lifetime is not negligible, appropriate safety measures must be taken to prevent such failures.

According to one of the objects of the present invention, an additional, redundant oscillator (backup oscillator) is provided.

However, it is extremely expensive to provide two identical oscillators of the same accuracy for each controller. Therefore, it is possible to provide an additional simplified backup oscillator in the processor of the controller. However, due to the simplified design of the backup oscillator, the clock frequency provided by the same may vary in broad limits, which may amount to up to ±50%.

It is possible to test this simplified backup oscillator during manufacturing and adjust the clock signal according to the test result.

This procedure, however, is both costly and insufficient in practice, since it does not take into account a possible change in the ambient conditions, e.g., in the operating temperature. Therefore, with this procedure at least appropriate compensation for the temperature variation of the backup oscillator is needed, which further increases the costs involved.

SUMMARY OF THE INVENTION

The clock signal loading device according to the present invention for the processor of a controller connected to a network, and a corresponding method are advantageous in that the device and method according to the present invention provide high accuracy for frequency adjustment and can operate using automatic self-adjustment when the ambient conditions change.

The present invention enables the use of a less expensive oscillator with greater tolerances in lieu of the standard oscillator in controllers. The controller with the less expensive oscillator is operated in the master-slave mode, instead of a multi-master mode, if the required synchronization time (adjustment time) is acceptable for a specific application.

The device and method according to the present invention use the communication signals carried by the network for deriving a control signal for controlling the clock signal change device and thus correct the variations of the respective oscillator.

According to an embodiment of the present invention, a second oscillator is provided for generating a second clock signal that can be loaded to the processor, as well as an adjustable loader to load the first clock signal to the processor of the controller in a first operating mode and for loading the second clock signal to the processor of the controller in a second operating mode. This embodiment enables a utilization of a multi-master principle.

According to another embodiment of the present invention, an evaluator is provided for evaluating whether the second clock signal contains an error. This embodiment allows a decision-making criterion to be established for the selection of the oscillator to be loaded to the processor.

According to yet another embodiment of the present invention, a control device is provided for setting the first operating mode if the evaluator encounters an error in the second clock signal and for setting the second operating mode if the evaluator does not encounter an error in the second clock signal, using a setting signal.

According to still another embodiment of the present invention, the clock signal changer modifies the frequency of the first clock signal. A frequency correction is advantageous because frequency directly affects the computing accuracy of the processor.

According to another embodiment of the present invention, the clock signal changer has a controllable frequency divider and/or a controllable frequency multiplier connected downstream from the first oscillator. It is advantageous to provide only one frequency divider and one frequency multiplier.

According to another embodiment of the present invention, the network is configured so that the communication signals contain data messages in a predefined form, preferably comprising a plurality of predefined fields.

According to another embodiment of the present invention, a determinator is provided for determining whether a predefined field of the data messages can be received from the communication signals transmitted over the network.

According to another embodiment of the present invention, the determinator has a non-volatile first memory device for storing the predefined field of the data messages and a comparator for comparing the communication signals transmitted over the network with the predefined field of the data message.

According to another embodiment of the present invention, the control device is configured so that it tunes the control signal by modifying the control signal until the predefined field of the data messages can be received. This type of tuning can be implemented in a particularly simple and cost-effective manner.

According to another embodiment of the present invention, the control device is configured so that, when modifying the control signal, it determines a range within which the predefined field of the data message can be received and tunes the control signal to a mid-range value of the range thus determined. This offers the advantage that slight fluctuations of the clock signal, e.g., due to changes in the ambient conditions, do not affect the function of the processor. Therefore, tuning has to be repeated less frequently.

According to another embodiment of the present invention, a preferably non-volatile second memory device is provided for storing the tuned control signal. This embodiment is advantageous in that, when tuning is begun, a previously determined control signal can be initially used, which reduces the time required for tuning.

According to another embodiment of the present invention, the control device includes the processor. This embodiment is advantageous in that no additional components are needed, but only appropriate software must be provided for driving the existing processor. In this case, the processor varies its own clock frequency depending on whether or not the communication signals transmitted over the network can be received.

According to another embodiment of the present invention, the network is a CAN network with a serial linear bus.

DETAILED DESCRIPTION

Figure 1:
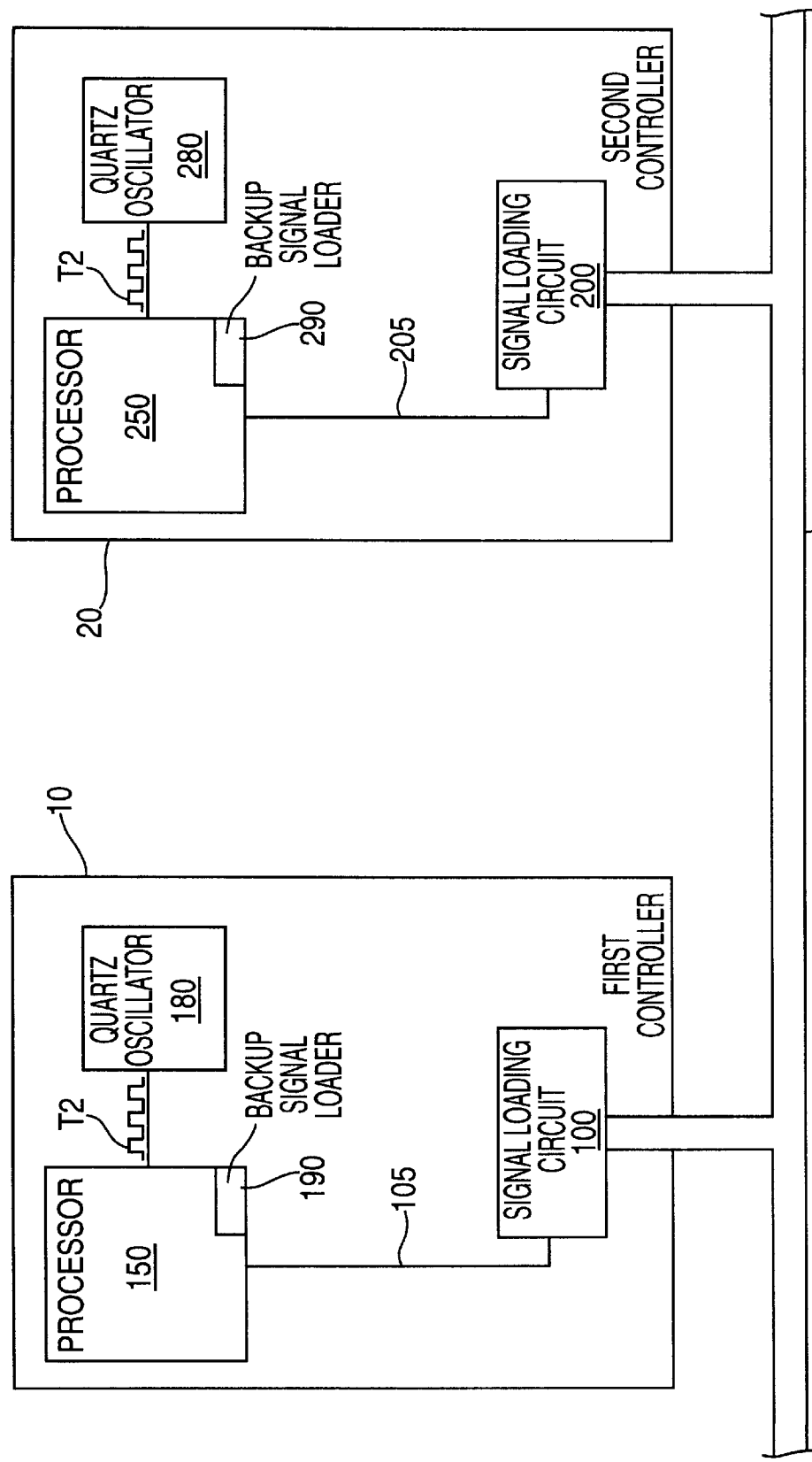
FIG. 1 shows a schematic diagram of a controller set in the form of two independent controllers, one of the controllers having a clock signal loading device according to the present invention for its processor.

As shown in FIG. 1, a first controller 10 in the form of an engine controller and a second controller 20 in the form of a pump controller are connected within Controller Area Network ("CAN") system via a serial linear bus 5.

For the sake of clarity, only the components that are relevant for the present invention are shown for each controller 10, 20. First and second controllers 10, 20 include signal loading circuits 100, 200, internal buses 105, 205, processors 150, 250, and quartz oscillators 180, 280 for generating a predefined clock signal T2.

Backup clock signal loaders (loading devices) 190, 290 are provided in processors 150, 250 of controllers 10 and 20, respectively.

Together with oscillators 180, 280, backup clock signal loading devices 190, 290 provide one embodiment of the clock signal loading device according to the present invention, which is described below with reference to controller 10.

The controller set illustrated in FIG. 1 operates as follows:

The CAN system normally operates using multi-master principle, where controllers 10, 20 are peers. This principle is advantageous in that in the case of failure of one of controllers 10, 20, the other controller remains fully available to the other components connected to bus 5.

Controllers 10, 20 communicate over bus 5 and exchange information as needed for their respective functions. In the CAN system, addressing takes place in the form of data messages of a predefined format, which have a given number of fields with a fixed content and a predetermined number of fields with freely available content. Messages are separated by predefined pauses. The data messages are also characterized by predefined message times and bit times.

In normal operation, oscillator 180, 280 supplies clock signal T2 to processor 150, 250 of the respective controller 10, 20. Processor 150, 250 is connected to the respective peripheral components via internal bus 105, 205, and is connected, in particular, to the common bus 5 via the respective signal loading circuit 100, 200, which serves as an interface.

When bus 5 is free, each controller 10, 20 can begin to transmit a data message. An identifier contained in the data message identifies the content of the data message, e.g., engine temperature or water pressure, and determines bus access priority for sending.

If two transmission requests collide, the one with lower priority must attempt to gain access later.

The data messages are normally received and acknowledged by all other controllers and network components, but are only needed by certain controllers. The decision on whether a data message received is of interest is determined by each controller by comparing the identifier with its own list of identifiers. In the case of agreement (e.g., a match), the data message received is accepted and made available to the controller's own processor.

Thus, in normal operation, oscillator 180 supplies clock signal T2 to processor 150. The backup clock signal loading device 190 monitors clock signal T2 of oscillator 180 for errors, in particular, in the embodiment shown in FIG. 1, for the stability of its frequency.

If an error occurs in oscillator 180, backup clock signal loading device 190 detect this error and sets the backup oscillator 130 contained therein (shown in FIG. 2) as clock signal emitter, tuning its frequency, subject to great tolerances, via the communication signals transmitted over bus 5.

This tuning procedure is described below with reference to FIG. 2, which shows an enlarged view of the embodiment of the clock signal loading device according to the present invention.

Figure 2:
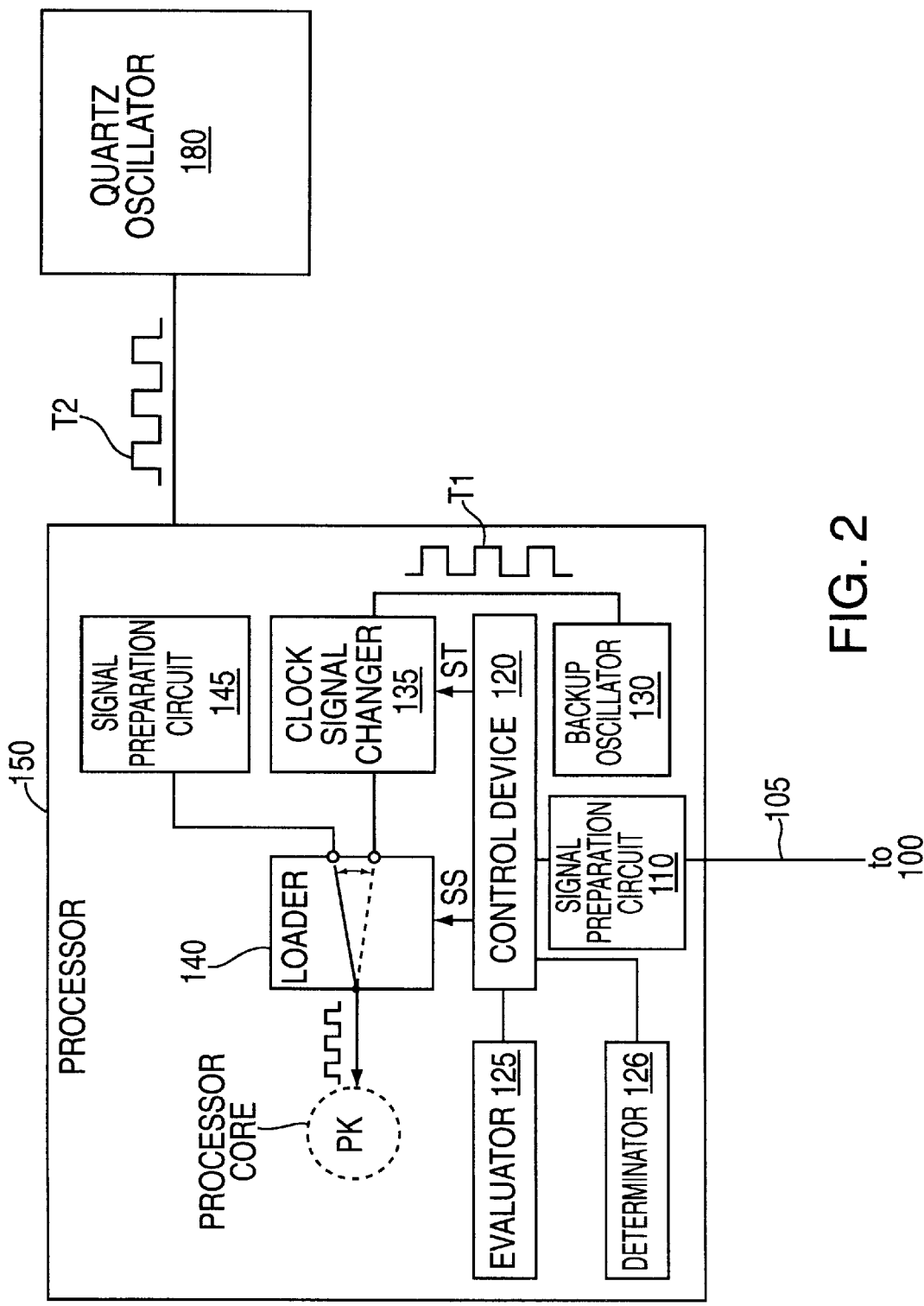
FIG. 2 shows an enlarged diagram of the embodiment of the clock signal loading device according to the present invention.

In particular, FIG. 2 shows exemplary components of the backup clock signal loading device 190 illustrated in FIG. 1, which may include a signal preparation circuit 110, a control device 120, an evaluator 125, a determinator 126, a backup oscillator 130 for generating clock signal T1, a clock signal changer 135 in the form of a frequency divider, a loader (loading device) 140 in the form of a controllable switch, another signal preparation circuit 145, and a schematically illustrated processor core (e.g., an arithmetic unit) PK. Furthermore, ST denotes a control signal and SS denotes a switching or load signal generated by control device 120.

This arrangement operates as follows:

In normal operation, evaluator 125 detects the error in clock signal T2 of oscillator 180.

Depending on the result of the evaluation, control device 120 generates a load signal SS for loader 140.

When evaluator 125 evaluates clock signal T2 as error-free, control device 120 sets loader 140 in the upper position (shown as a solid line) to load clock signal T2 of oscillator 180 to processor core PK.

When evaluator 125 evaluates clock signal T2 as containing errors, control device 120 sets loader 140 in the lower position (shown as a dashed line) and thus decouples clock signal T2 of oscillator 180 from processor core PK.

Determinator 126 can determine the receivability of a predefined field of the data messages from the communication signals transmitted over the network and relayed to internal bus 105.

For this purpose, determinator 126 advantageously contains a non-volatile first memory (not shown) for storing the predefined field of the data messages (e.g., as pre-programmed during manufacturing). Furthermore, determinator 126 contains a comparator (not shown) for comparing the communication signals received over the network with the predefined field in the data message.

Control device 120 varies control signal ST for controlling clock signal changer 135 to change the frequency, until the predefined field of the data messages can be received according to the output signal of determinator 126. Then control device 120 determines, by further varying control signal ST, the range of control signal ST within which the predefined field of the data messages can be received. Control signal ST is then set to the middle value of the range thus determined. This tuning procedure can be repeated if needed, in particular when the receivability criterion of the predefined field of the data message is no longer met. Thus the frequency of clock signal T1 can be continuously adjusted using clock signal changer 135 connected into the circuit.

In particular, distinction can be made between two failure scenarios:

a) failure of oscillator 180 takes place after a normal start; and b) no start takes place, since failure occurred earlier during resetting.

In scenario a), it is recommended that backup oscillator 130 be tuned during normal operation, so that in the event of an error, the function of processor 150 can be maintained in a seamless manner. The tuning data obtained, i.e., at least one suitable value of control signal ST, can be stored in a memory.

In scenario b), oscillator 180 does not begin to oscillate, which is normally detected by processor 150 by the fact that the lock bit is not set within a given time. In this case, tuning may have to be restarted from a very early stage, which causes a certain delay. One possible remedy if oscillator 180 has worked at least once (e.g., during the factory inspection test) consists of providing the memory provided for the tuning data according to scenario a) as a non-volatile read/write memory.

It should be noted that in the embodiment described above, control device 120, operating mode setter (i.e., evaluator) 125 and determinator 126 serve components that are already present, so in particular processor 150 itself. The additional functions needed according to the present invention can be implemented in the software, independently of the actual clock rate of processor 150.

Although the present invention was described above with reference to a preferred embodiment, it is not limited to the described embodiment, and can be modified in a number of ways.

In particular, the present invention is not limited to determining the receivability of the predetermined field of data messages. The device and method according to the present invention can also determine the receivability of an entire standard data message.

Synchronization can also be performed based on the message times and bit times determined, for example, using a suitable time measuring device.

Furthermore, instead of or in addition to frequency, other signal parameters of clock signal T1 can be influenced.

Instead of a frequency divider, a frequency multiplier, a combination of both, or another type of frequency control (e.g., a voltage-controlled oscillator) can be used.

In addition, the network does not need to be a bus network, but can be an optical network or a wireless network.

LIST OF REFERENCE SYMBOLS

| | |
|---|---|
| 5 | bus |
| 10 | first controller |
| 20 | second controller |
| 100 | signal loading circuit |
| 105 | internal bus |
| 110 | signal loading circuit |
| 120 | control device |
| 125 | operating mode setting device |
| 126 | determinator |
| 130 | backup oscillator |
| 135 | clock signal changer |
| 140 | loader |
| 145 | signal loading circuit |
| 150 | processor |
| 180 | oscillator |
| 190 | backup clock signal loading circuit |
| 200 | signal loading circuit |
| 205 | internal bus |
| 250 | processor |
| 280 | oscillator |
| 290 | backup clock signal loading device |
| T1 | first clock signal |
| T2 | second clock signal |
| ST | control signal |
| SS | load signal |

What is claimed is:

1. A clock signal loading device for a processor of a controller, the controller being coupled to a network, the clock signal loading device comprising:

a first oscillator for generating a first clock signal, the first clock signal being loadable into the processor;

a controllable clock signal changing device for modifying the first clock signal; and a control device coupled to the network and coupled to the controllable clock signal changing device and generating a control signal for controlling the controllable clock signal changing device as a function of communication signals transmitted over the network so that messages are receivable from the network.

2. The clock signal loading device according to claim 1, further comprising:

a second oscillator generating a second clock signal provided to the processor; and an adjustable loading device loading the first clock signal into the processor in a first operating mode, and loading the second clock signal into the processor in a second operating mode.

3. The clock signal loading device according to claim 2, further comprising:

an evaluation device checking the second clock signal for errors.

4. The clock signal loading device according to claim 1, wherein the controllable clock signal changing device changes a frequency of the first clock signal.

5. The clock signal loading device according to claim 4, wherein the controllable clock signal changing device includes at least one of a controllable frequency divider and a controllable frequency multiplier coupled downstream of the first oscillator.

6. The clock signal loading device according to claim 1, wherein the network is configured to provide the communication signals with predetermined-form data messages.

7. The clock signal loading device according to claim 6, wherein the predetermined-form data messages include predefined fields.

8. The clock signal loading device according to claim 7, further comprising:
   a determination device determining if a predetermined field of the data messages is receivable from the communication signals.

9. The clock signal loading device according to claim 8, wherein the control device adjusts the control signal until at least one of the predefined fields of the data messages is receivable by the controller.

10. The clock signal loading device according to claim 9, further comprising:
   a memory device storing the control signal.

11. The clock signal loading device according to claim 10, wherein the memory device is a non-volatile memory device.

12. The clock signal loading device according to claim 1, wherein the control device includes the processor.

13. The clock signal loading device according to claim 1, wherein the network is a Controller Area Network having a serial linear bus.

14. A clock signal loading device for a processor of a controller, the controller being coupled to a network, the clock signal loading device comprising:
   a first oscillator for generating a first clock signal, the first clock signal being loadable into the processor;
   a controllable clock signal changing device for modifying the first clock signal;
   a control device coupled to the network and generating a control signal for controlling the controllable clock signal changing device as a function of communication signals transmitted over the network;
   a second oscillator generating a second clock signal provided to the processor;
   an adjustable loading device loading the first clock signal into the processor in a first operating mode, and loading the second clock signal into the processor in a second operating mode; and
   an evaluation device checking the second clock signal for errors;
   wherein, using a setting signal, the control device sets the first operating mode if the evaluation device determines that the second clock signal contains the errors, and
   wherein, using the setting signal, the control device sets the second operating mode if the evaluation device determines that the second clock signal does not contain the errors.

15. A clock signal loading device for a processor of a controller, the controller being coupled to a network, the clock signal loading device comprising:
   a first oscillator for generating a first clock signal, the first clock signal being loadable into the processor;
   a controllable clock signal changing device for modifying the first clock signal;
   a control device coupled to the network and generating a control signal for controlling the controllable clock signal changing device as a function of communication signals transmitted over the network, wherein the network is configured to provide the communication signals with predetermined-form data messages that include predefined fields; and
   a determination device determining if a predetermined field of the data messages is receivable from the communication signals, wherein the determination device includes a non-volatile memory device for storing the predefined fields of the data messages, and a comparing device for comparing the communication signals with at least one of the predefined fields of the data messages.

16. A clock signal loading device for a processor of a controller, the controller being coupled to a network, the clock signal loading device comprising:
   a first oscillator for generating a first clock signal, the first clock signal being loadable into the processor;
   a controllable clock signal changing device for modifying the first clock signal;
   a control device coupled to the network and generating a control signal for controlling the controllable clock signal changing device as a function of communication signals transmitted over the network, wherein the network is configured to provide the communication signals with predetermined-form data messages that include predefined fields; and
   a determination device determining if a predetermined field of the data messages is receivable from the communication signals;
   wherein:
      the control device adjusts the control signal until at least one of the predefined fields of the data messages is receivable by the controller; and
      when the control signal is adjusted, the control device determines a range for receiving at least one of the predefined fields of the data messages, and adjusts the control signal to a value in a middle of the determined range.

17. A method for loading a clock signal into a processor of a controller, the controller being coupled to a network, the method comprising the steps of:
   generating the clock signal;
   loading the clock signal into the processor;
   detecting communication signals transmitted over the network; and
   adjusting the clock signal as a function of the detected communication signals so that messages are receivable from the network.

18. A clock signal loading device for a processor of a controller, the controller being coupled to a network, the clock signal loading device comprising:
   a first oscillator for generating a first clock signal, the first clock signal being loadable into the processor;
   means for modifying the first clock signal;
   means for receiving communication signals transmitted over the network; and
   means for generating a control signal to control the means for modifying the first clock signal based on the communication signals so that messages are receivable from the network.

19. The clock signal loading device according to claim 18, further comprising:
   a second oscillator generating a second clock signal provided to the processor; and
   means for loading the first clock signal into the processor in a first operating mode and for loading the second clock signal into the processor in a second operating mode.

20. The clock signal loading device according to claim 19, further comprising means for checking the second clock signal for errors.

21. The clock signal loading device according to claim 20, wherein the means for generating sets the first operating mode if the means for checking determines that the second clock signal contains the errors and sets the second operating mode if the means for checking determines that the second clock signal does not contain the errors.

22. A clock-signal generating device for a processor of a controller coupled to a network, comprising:

a first oscillator for generating a first clock signal for the processor;

a controllable clock signal changing device for changing a frequency of the first clock signal;

a control device coupled to the network for generating a control signal for controlling the controllable clock signal changing device as a function of communications signals transmitted over the network, wherein the communication signals include data messages having a predefined form including a plurality of fields; and a determining device for determining if at least one field of the plurality of fields in at least one of the data messages is receivable and for outputting another control signal to the control device;

wherein the control device tunes the control signal by variation until the at least one field is receivable.

23. The clock-signal generating device according to claim 22, further comprising:

a second oscillator for generating a second clock signal for the processor; and an adjustable switching device for supplying the first clock signal to the processor in a first operating mode and for supplying the second clock signal to the processor in a second operating mode.

24. The clock-signal generating device according to claim 22, further comprising an evaluation device for evaluating the second clock signal to determine if it is in error.

25. The clock-signal generating device according to claim 24, wherein the control device uses a setting signal to set the first operating mode if the evaluation device determines the second clock signal is in error and to set the second operating mode if the evaluation device determines the second clock signal is not in error.

26. The clock-signal generating device according to claim 22, wherein the controllable clock signal changing device includes at least one of a controllable frequency divider and a controllable frequency multiplier, each of which is coupled downstream of the first oscillator.

27. The clock-signal generating device according to claim 22, wherein the determining device includes a nonvolatile first memory device for storing the at least one field and a comparator for comparing the communications signals transmitted over the network with the at least one field.

28. The clock-signal generating device according to claim 22, wherein the control device varies the control signal to detect a region within which the at least one field is receivable and tunes the control signal to a mean value within the region so as to provide a tuned control signal.

29. The clock-signal generating device according to claim 28, further comprising a nonvolatile second memory device for storing the tuned control signal.

30. The clock-signal generating device according to claim 22, wherein the control device includes the processor.

31. The clock-signal generating device according to claim 22, wherein the network is a Controller Area Network having a serial linear bus.

32. A method of generating a clock signal for a processor of a controller coupled to a network, comprising the steps of:

generating a first clock signal;

supplying the first clock signal to the processor;

receiving communications signals transmitted via the network, wherein the communication signals include data messages having a predefined form including a plurality of fields;

detecting if at least one field of the communications signals is receivable and providing a detection result; and varying a frequency of the first clock signal as a function of the detection result until the at least one field is receivable.

* * * * *